United States Patent [19]
St. Louis

[11] Patent Number: 4,763,015
[45] Date of Patent: Aug. 9, 1988

[54] APPLIANCE/REFRIGERATOR POWER CONTROLLER

[76] Inventor: Raymond F. St. Louis, 32 Rensselaer Rd., Essex Fells, N.J. 07021

[21] Appl. No.: 120,870

[22] Filed: Nov. 16, 1987

[51] Int. Cl.$^4$ ...................... H01H 35/00; H01H 3/34
[52] U.S. Cl. .................................. 307/126; 307/141.4
[58] Field of Search ...................... 307/126, 140, 141.4, 307/141.8, 38, 39, 592; 361/100; 315/360

[56]  References Cited
U.S. PATENT DOCUMENTS

| | | | |
|---|---|---|---|
| 3,600,635 | 8/1971 | Neilson | 307/39 X |
| 4,204,149 | 5/1980 | Cleary et al. | 307/141.4 |
| 4,217,616 | 8/1980 | Jessup | 361/100 |
| 4,382,192 | 5/1983 | Mendelson | 307/141.4 |

Primary Examiner—William M. Shoop, Jr.
Assistant Examiner—Sharon D. Logan
Attorney, Agent, or Firm—Donald N. Timbie

[57] ABSTRACT

A power controller having first and second power outlets, connections between one side of an A.C. line to one side of each outlet, a current sensing impedance connected between the other side of the A.C. line and the other side of the first power outlet, a triac connected between the other side of said A.C. line and the other side of the second power outlet, a first operational amplifier normally maintaining said triac in a conductive condition and a second operational amplifier for preventing current from flowing through said triac to said second power outlet while an appliance coupled to said first power outlet draws a given amount of current through said sensing impedance and for a given time said appliance stops drawing said given amount of current through said impedance.

3 Claims, 1 Drawing Sheet

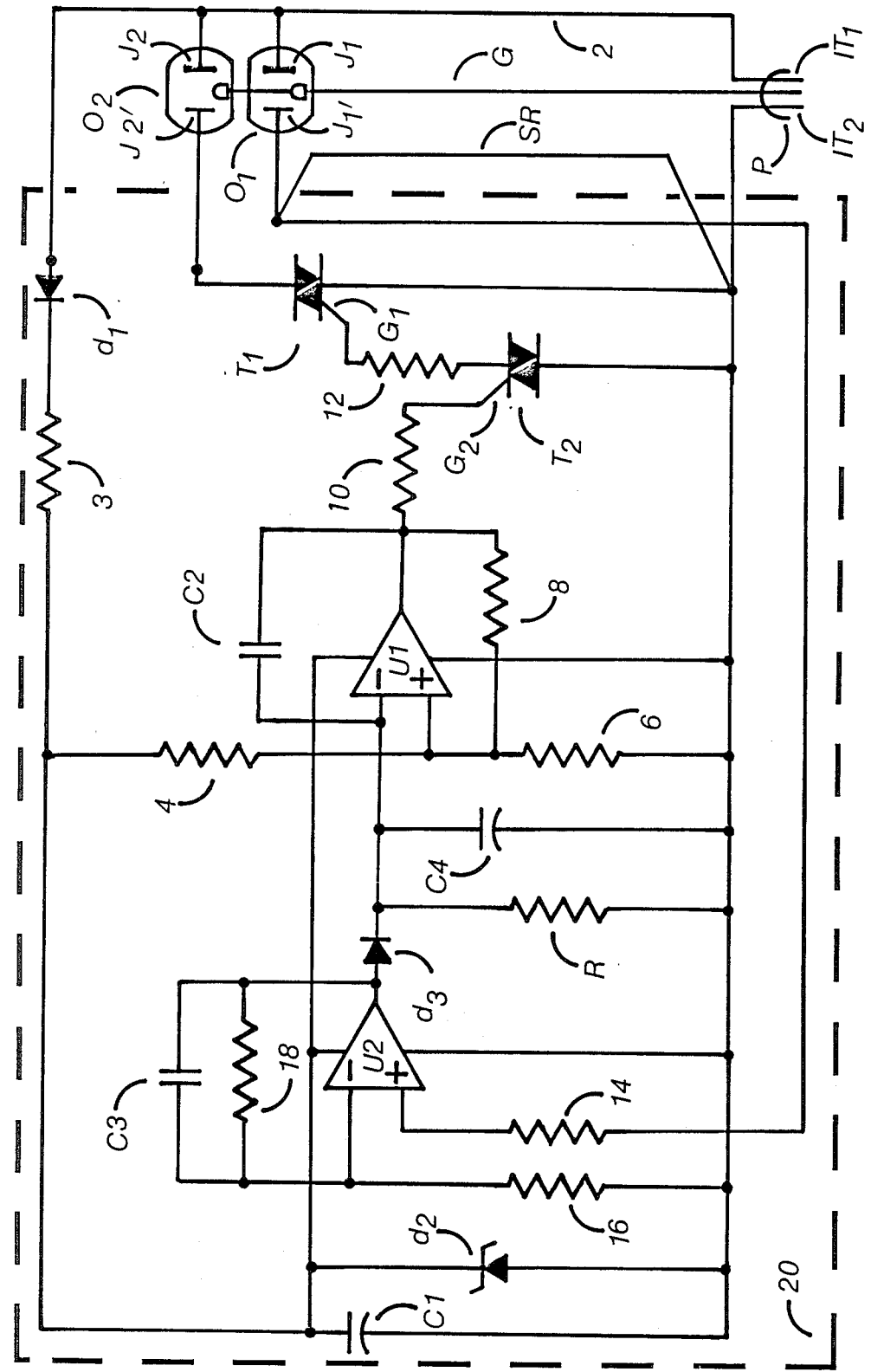

APPLIANCE/REFRIGERATOR POWER CONTROLLER

BACKGROUND OF THE INVENTION

In homes as well as other structures it is often desirable to be able to plug an appliance such as a microwave oven to one outlet of a duplex A.C. outlet and to plug a refrigerator into the other, or to plug both into outlets fed from the same fused line. Under such circumstances the fuse may blow if both appliances are on at the same time. Convenience would require that the outlet for the refrigerator be de-energized whenever the other appliance is turned on rather than visa versa. Whereas this could be done, it is also desirable that the outlet for the refrigerator remain de-energized for a time as long as several minutes once it has been de-energized to prevent "short cycling", a well known phenomenon not detailed herein that can cause damage to the refrigerator compressor.

BRIEF SUMMARY OF THE INVENTION

In a power control circuit of this invention, A.C. voltage is applied to a first power outlet via a small sensing impedance such as a few inches of ordinary house circuit wire and to a second power outlet via a triac. A first operational amplifier is coupled so as to normally turn on the triac and permit voltage to reach the second power outlet, and a second operational amplifier is coupled between the sensing impedance and the first operational amplifier so as to cause it to turn off the triac and prevent voltage from reaching the second outlet whenever current flowing in the sensing impedance exceeds a given amount. The coupling between the second operational amplifier and the first is such as to keep the triac turned off for a selected period after the current flowing in the sensing impedance falls below said given value. Thus, if a microwave oven is plugged into the first power outlet and a refrigerator is plugged into the second, the refrigerator will be turned off whenever the oven is on and will remain off for the selected period after the oven is turned off.

All of the components of the power control circuit can be conveniently mounted within a box that is 4.50" long 1.25" deep and 2.25" wide in such a manner that the plug for insertion into a wall outlet is on one side of the box and the first and second power outlets respectively for a microwave oven or the like and a refrigerator are on the other side. The fact that the triac switches only when the current drawn by a refrigerator passes through zero prevents it from producing radio frequency interference and assures that full power is delivered to the refrigerator without regard to whether the phase of the current drawn by the refrigerator leads or lags or is equal to the phase of the line voltage. The fact that the sensing resistance can be wire of the same gauge as standard house wiring reduces any voltage drop to an insignificant value.

BRIEF DESCRIPTION OF THE DRAWING

The drawing is a schematic representation of a preferred form of the invented circuit.

DETAILED DESCRIPTION OF THE INVENTION

In the drawing input terminals $IT_1$ and $IT_2$ are shown as being the contacts of an A.C. power plug P that can be inserted into a wall outlet. The power input terminal $IT_1$ is connected to contacts $J_1$ and $J_2$ of power outlets $O_1$ and $O_2$ respectively via a conductor 2. The other power input terminal $IT_2$ is connected to contact $J_{1'}$ of power outlet $O_1$ via about 10 inches of house wire SR that, as will be described, acts as a sensing impedance, in this case a reactance, to indicate when a microwave oven or the like that is plugged into the outlet $O_1$ is drawing more than a given amount of current. The latter power input terminal $IT_2$ is also coupled to the other contact $J_{2'}$ of the power outlet $O_2$ via a triac $T_1$. A ground wire G is connected to appropriate contacts in the plug P and the outlets $O_1$ and $O_2$.

The triac $T_1$ is capable of passing the maximum current permitted in the circuit and is controlled by an operational amplifier $U_1$ and a triac $T_2$ so as to normally conduct current and apply voltage to the contact $J'_2$ of the outlet $O_2$. A rectifying means comprised of a resistor 3, a diode $d_1$, a zener diode $d_2$ and a capacitor C1 that is connected in series between the power input terminals $IT_1$ and $IT_2$ provide a regulated D.C. voltage across the capacitor C1 that serves as a supply and operating voltage for the operational amplifiers $U_1$ and $U_2$. Resistors 4 and 6 are connected in series across the operating voltage, and their junction is connected to the non-inverting input of $U_1$ so as to apply a bias voltage thereto. A resistor 8 is connected between the output of $U_1$ and its non-inverting input, and a resistor R is connected between the inverting input of $U_1$ and the A.C. power input therminal $IT_2$. The values of the resistors 4, 6, and 8 may be such as to produce a positive voltage such as $+9$ volts at the non-inverting input of $U_1$. When no voltage is applied across the resistor R, a $+DC$ voltage is produced at the output of $U_1$. The effect of noise is reduced by a capacitor C2 connected between the output of $U_1$ and its inverting input.

The $+DC$ voltage at the output of $U_1$ is coupled via a resistor 10 to a gate $G_2$ of a triac $T_2$ having one terminal connected via a resistor 12 to a gate $G_1$ of the triac $T_1$ and the other terminal connected to the A.C. power input terminal $IT_2$. In this situation the triac $T_2$ supplies the small amount of current required to cause $T_1$ to conduct as desired. Whenever the A.C. current passing through $T_1$ passes very close to a value of zero, $T_1$ is turned off, but it starts conduction again when the AC voltage applied to its gate $G_1$ is other than zero. This results in triac $T_1$ switching during zero current crossings and delivering full power to the load regardless of whether the phase angle of the load is resistive, capacitive, or inductive. This also prevents the generation of R.F. interference.

De-energization of the outlet $O_2$ occurs whenever an appliance such as a microwave oven that is plugged into the outlet $O_1$ draws a given amount of A.C. current through the sensing resistor SR and is achieved by a circuit including an operational amplifier $U_2$. Its non-inverting input is connected via a resistor 14 to the contact $J_1'$ of outlet $O_1$ to which sensing the resistor SR is connected, and its inverting input is connected via a resistor 16 to the A.C. power input terminal $IT_2$ so that the A.C. voltage across the sensing resistor SR is applied between the inputs of $U_2$. A resistor 18 and a capacitor C3 are connected in parallel between the output of $U_2$ and its inverting input so as to provide considerable amplification of the small voltage produced across the sensing resistor SR. Capacitor C3 provides a reduction in the gain of $U_2$ to high frequency noise voltages that may appear on the A.C. power line.

The square wave output of $U_2$ is coupled via a blocking diode $d_3$ to the inverting input of $U_1$, and a capacitor C4 is connected in parallel with the resistor R.

The operation of the circuit just described is as follows. Whenever an appliance plugged into the outlet $O_1$ draws enough A.C. current through the sensing resistor SR, the operational amplifier $U_2$ produces at its output a positive square wave of voltage relative to the input terminal $IT_2$ during positive half cycles of the A.C. voltage across ST. Because there is little or no resistance in series with the capacitor C4, the charging time constant is so low that C4 is almost instantaneously charged to the voltage of the square wave. This causes the voltage at the inverting input of $U_1$ to exceed the bias voltage at its non-inverting input when the microwave oven is drawing current for microwave cooking, as opposed to the current that is always drawn to power the oven control circuits, clock, digital readout, etc. The output of $U_1$ then becomes negative. The application of this negative voltage to the gate $G_2$ causes $T_2$ to turn off when the current through it passes through zero, and this in turn permits $T_1$ to turn off when the current drawn by a refrigerator plugged into $O_2$ passes through zero.

The power outlet $O_2$ remains de-energized until the voltage across C4 is lowered by discharge through the resistor R to a value less than the voltage now applied to the non-inverting input of $U_1$. As the latter voltage may be as low as $+1$ volt it is considerably less than the bias voltage previously applied with the result that a large hysteresis is provided thereby allowing long time delays to be achieved with a small capacitance value for capacitor C4.

The components within the rectangle 20 can be mounted on a printed wiring board. All components are specified in the table below.

| | | | | |
|---|---|---|---|---|
| R3 = 6.8 KOHM | R6 = 51 KOHM | R10 = 1.8 KOHM | R14 = 1 KOHM | R18 = 22 MEGOHM |
| R4 = 100 KOHM | R8 = 10 KOHM | R12 = 51 OHM | R16 = 33 KOHM | R = 5.6 MEGOHM |
| C1 = 220 uF | C2 = 270 pF | C3 = 27 pF | C4 = 10 uF | $T_2$ = L201E3 |
| $d_1$ = 1N4005 | $d_2$ = 1N5242B | $d_3$ = 1N4148 | $T_1$ = Q2015R5 | $U_1/U_2$ = LM358N |

What is claimed is:

1. A power control circuit comprising first and second A.C. power input terminals,
   a first power outlet having two contacts,
   a second power outlet having two contacts,
   a connection from said first input terminal to one contact in each power outlet,
   a sensing impedance connected between said second input terminal and the other contact of said first power outlet,
   a triac having a gate and two terminals,
   a connection between one of said terminals of said triac and the other contact of said second power outlet,
   a connection between the other of said terminals of said triac and said second input terminal, and
   control means coupled to said sensing impedance for applying a voltage to said gate so as to permit current to flow between the terminals of said triac when less than a given value of current is flowing in said sensing impedance and to prevent current from flowing between said latter terminals from a time when current exceeding said given value first flows in said sensing impedance until a given time after current in excess of said given value ceases to flow in said sensing impedance.

2. A power control circuit as set forth in claim 1 wherein said control means is comprised of
   a first operational amplifier having inverting and non-inverting inputs and an output,
   means coupling the output of said first operational amplifier to said gate of said triac,
   means including a rectifier coupled to said A.C. power input terminals for respectively applying a given D.C. voltage to said non-inverting input of said first operational amplifier than to said inverting input thereof, and
   a second operational amplifier having inverting and non-inverting inputs and an output,
   a connection between said non-inverting input and the end of said sensing resistance remote from said second A.C. power input terminals,
   a capacitor
   a blocking diode connected between the output of said second operational amplifier and one side of said capacitor,
   a connection between said one side of said capacitor and the inverting input of said first operational amplifier,
   a connection between the other side of said capacitor and said second A.C. power input terminal,
   a resistor connected in parallel with said capacitor, the gain provided by said second operational amplifier and the time constant of said resistor and capacitor being such as to maintain a voltage at the inverting input of said first operational amplifier such as to bias said gate in such manner as to prevent current from flowing between the terminals of said triac for a desired interval.

3. A power control circuit as set forth in claim 2 wherein
   said means for coupling the output of the first operational amplifier to said gate includes a second triac.

* * * * *